US010684519B2

(12) United States Patent
(10) Patent No.: US 10,684,519 B2
(45) Date of Patent: Jun. 16, 2020
Gan et al.

(54) COLOR-FILTER ON ARRAY TYPE ARRAY SUBSTRATE AND LIQUID CRYSTAL DISPLAY PANEL

(71) Applicant: Shenzhen China Star Optoelectronics Semiconductor Display Technology Co., LTD., Shenzhen, Guangdong (CN)

(72) Inventors: Qiming Gan, Shenzhen (CN); Meng Wang, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/580,792

(22) PCT Filed: May 3, 2017

(86) PCT No.: PCT/CN2017/082816

§ 371 (c)(1),
(2) Date: Dec. 8, 2017

(87) PCT Pub. No.: WO2018/176569

PCT Pub. Date: Oct. 4, 2018

(65) Prior Publication Data

US 2018/0314088 A1 Nov. 1, 2018

(30) Foreign Application Priority Data

Apr. 1, 2017 (CN) .......................... 2017 1 0212928

(51) Int. Cl.
*G02F 1/1362* (2006.01)
*G02F 1/1368* (2006.01)

(52) U.S. Cl.
CPC .......... *G02F 1/1362* (2013.01); *G02F 1/1368* (2013.01); *G02F 1/136286* (2013.01); *G02F 2001/136222* (2013.01); *G02F 2201/52* (2013.01)

(58) Field of Classification Search
CPC ............. G02F 1/1362; G02F 1/136286; G02F 1/133514
See application file for complete search history.

(56) References Cited

U.S. PATENT DOCUMENTS

2016/0204094 A1* 7/2016 Yang .................... H01L 27/124 257/773
2017/0039990 A1* 2/2017 Song .................... G09G 3/2003

FOREIGN PATENT DOCUMENTS

| | | | |
|---|---|---|---|
| CN | 101101346 | A | 1/2008 |
| CN | 101191914 | A | 6/2008 |
| CN | 103792723 | A | 5/2014 |
| CN | 104464539 | A | 3/2015 |
| CN | 104820326 | A | 8/2015 |

* cited by examiner

*Primary Examiner* — Lucy P Chien
(74) *Attorney, Agent, or Firm* — Kirton McConkie; Evan R. Witt

(57) ABSTRACT

A color-filter on array (COA) type array substrate is provided. Sub-pixels connected to an identical data line include red sub-pixels R, green sub-pixels G, and blue sub-pixels B, all of which are the same in number. The sub-pixels connected to an identical scan line include the red sub-pixels R, the green sub-pixels G, and the blue sub-pixels B, all of which are the same in number.

12 Claims, 3 Drawing Sheets

| | | | | | | | |
|---|---|---|---|---|---|---|---|
| R | B | G | R | B | G | R | B | G |

201

| R | B | G | R | B | G | R | B | G |
|---|---|---|---|---|---|---|---|---|
| R | B | G | R | B | G | R | B | G |
| G | R | B | G | R | B | G | R | B |
| G | R | B | G | R | B | G | R | B |
| B | G | R | B | G | R | B | G | R |
| B | G | R | B | G | R | B | G | R |
| R | B | G | R | B | G | R | B | G |
| R | B | G | R | B | G | R | B | G |
| G | R | B | G | R | B | G | R | B |

COLOR-FILTER ON ARRAY TYPE ARRAY SUBSTRATE AND LIQUID CRYSTAL DISPLAY PANEL

FIELD OF THE INVENTION

The present invention relates to a technical field of liquid crystal displays, and more particularly to a color-filter on array (COA) type array substrate and a liquid crystal display panel having the same.

BACKGROUND OF THE INVENTION

Color-filter on array (COA) technology is the integrated technology that directly forms a color-filter layer on an array substrate, which can effectively solve the problem of leaking light resulting from alignment offset during a cell process of a liquid crystal display device and other problems, and can significantly increase an aperture ratio of display pixels, and decrease parasitic capacitance of the display pixels.

However, when forming the color-filter layer on the array substrate, because charged ions in the color-filter layer diffuse, thin film transistors in the display pixels are affected, causing the problem of color errors of the display pixels to occur. However, different colors of the color-filter layer affect the display pixels in different degrees, and it is hard to apply uniform adjustments to the display pixels of the whole display panel to overcome the impact of the color-filter layer.

In summary, in the existing COA type liquid crystal display panel, the color filter layer affects the thin film transistors in the display pixels, and therefore results in the color errors of the display pixels, which further cause abnormality of a display image.

SUMMARY OF THE INVENTION

The present invention provides a color-filter on array (COA) type array substrate, wherein the technical problem of displaying being affected by the color errors of the display pixels resulting from the leakage current of the thin film transistors of the display pixels caused by the ion diffusion of the color-filter layer can be overcome by changing the arrangement manner of the sub-pixels.

In order to solve the aforementioned problem, the present invention provides the following technical solution.

The present invention provides a COA type array substrate, which includes:

a substrate;

thin film transistors arranged in an array on a surface of the substrate, and including gates, sources, and drains;

data lines connected to the sources of the thin film transistors, so as to input a display data signal into display pixels;

scan lines vertically intersecting with the data lines to define the display pixels, wherein the scan lines are connected to the gates of the thin film transistors, so as to control the gates of the thin film transistors to be turned on or off; and a color resist layer located on the display pixels, and configured to filter a back light transmitted therethrough into a color light;

wherein each of the display pixels includes a red sub-pixel R, a green sub-pixel G and a blue sub-pixel B;

wherein sub-pixels connected by the same one of the data lines are continuous;

wherein the sub-pixels connected by the same one of the data lines include the red sub-pixels R, the green sub-pixels G, and the blue sub-pixels B, and the red sub-pixels R, the green sub-pixels G, and the blue sub-pixels B are the same in number;

wherein, in the sub-pixels connected by the same one of the data lines, the red sub-pixels R, the green sub-pixels G, and the blue sub-pixels B are sequentially arranged in a cyclic manner; and wherein the sub-pixels connected by the same one of the scan lines include the red sub-pixels R, the green sub-pixels G, and the blue sub-pixels B, and the red sub-pixels R, the green sub-pixels G, and the blue sub-pixels B are the same in number.

In accordance with a preferred embodiment of the present invention, in the sub-pixels connected by the same one of the data lines, two of the sub-pixels adjacent to each other have different colors from each other, and two of the sub-pixels being the same in color are spaced apart by two of the sub-pixels having different colors from each other.

In accordance with a preferred embodiment of the present invention, in the sub-pixels connected by the same one of the data lines, red pixel groups, green pixel groups, and blue pixel groups are alternately distributed, two pixel groups being the same in color are spaced apart by two pixel groups having different colors from each other, and each of the pixel groups has the same number of sub-pixels.

In accordance with a preferred embodiment of the present invention, the number of the sub-pixels in each of the pixel groups is N, wherein N is a positive integer greater than 1.

In accordance with a preferred embodiment of the present invention, in the sub-pixels connected by the same one of the scan lines, any two of the sub-pixels adjacent to each other have different colors from each other, and two of the sub-pixels being the same in color are spaced apart by two of the sub-pixels having different colors from each other.

In accordance with a preferred embodiment of the present invention, in the sub-pixels connected by the same one of the scan lines, each row of the sub-pixels is arranged in a sequence of the red sub-pixel R, the blue sub-pixel B, and the green sub-pixel G in a cyclic manner.

The present invention also provides a COA type array substrate, which includes:

a substrate;

thin film transistors arranged in an array on a surface of the substrate, and including gates, sources, and drains;

data lines connected to the sources of the thin film transistors, so as to input a display data signal into display pixels;

scan lines vertically intersecting with the data lines to define the display pixels, wherein the scan lines are connected to the gates of the thin film transistors, so as to control the gates of the thin film transistors to be turned on or off; and a color resist layer located on the display pixels, and configured to filter a back light transmitted therethrough into a color light;

wherein each of the display pixels includes a red sub-pixel R, a green sub-pixel G and a blue sub-pixel B;

wherein sub-pixels connected by the same one of the data lines are continuous;

wherein the sub-pixels connected by the same one of the data lines include the red sub-pixels R, the green sub-pixels G, and the blue sub-pixels B, and the red sub-pixels R, the green sub-pixels G, and the blue sub-pixels B are the same in number; and wherein the sub-pixels connected by the same one of the scan lines include the red sub-pixels R, the green sub-pixels G, and the blue sub-pixels B, and the red sub-pixels R, the green sub-pixels G and the blue sub-pixels B are the same in number.

In accordance with a preferred embodiment of the present invention, in the sub-pixels connected by the same one of the data lines, two of the sub-pixels adjacent to each other have different colors from each other, and two of the sub-pixels being the same in color are spaced apart by two of the sub-pixels having different colors from each other.

In accordance with a preferred embodiment of the present invention, in the sub-pixels connected by the same one of the data lines, red pixel groups, green pixel groups, and blue pixel groups are alternately distributed, two pixel groups being the same in color are spaced apart by two pixel groups having different colors from each other, and each of the pixel groups has the same number of sub-pixels.

In accordance with a preferred embodiment of the present invention, the number of the sub-pixels in each of the pixel groups is N, wherein N is a positive integer greater than 1.

In accordance with a preferred embodiment of the present invention, in the sub-pixels connected by the same one of the scan lines, any two of the sub-pixels adjacent to each other have different colors from each other, and two of the sub-pixels being the same in color are spaced apart by two of the sub-pixels having different colors from each other.

In accordance with a preferred embodiment of the present invention, in the sub-pixels connected by the same one of the scan lines, each row of the sub-pixels is arranged in a sequence of the red sub-pixel R, the blue sub-pixel B, and the green sub-pixel G in a cyclic manner.

According to the foregoing objects of the present invention, a liquid crystal display panel is provided and includes:

an upper substrate;

a lower substrate; and a liquid crystal layer located between the upper substrate and the lower substrate;

wherein the lower substrate includes:

thin film transistors arranged in an array on a surface of the substrate, and including gates, sources, and drains;

data lines connected to the sources of the thin film transistors, so as to input a display data signal into display pixels;

scan lines vertically intersecting with the data lines to define the display pixels, wherein the scan lines are connected to the gates of the thin film transistors, so as to control the gates of the thin film transistors to be turned on or off; and a color resist layer located on the display pixels, and configured to filter a back light transmitted therethrough into a color light;

wherein each of the display pixels includes a red sub-pixel R, a green sub-pixel G and a blue sub-pixel B;

wherein sub-pixels connected by the same one of the data lines are continuous;

wherein the sub-pixels connected by the same one of the data lines include the red sub-pixels R, the green sub-pixels G, and the blue sub-pixels B, and the red sub-pixels R, the green sub-pixels G, and the blue sub-pixels B are the same in number; and wherein the sub-pixels connected by the same one of the scan lines include the red sub-pixels R, the green sub-pixels G and the blue sub-pixels B, and the red sub-pixels R, the green sub-pixels G, and the blue sub-pixels B are the same in number.

In accordance with a preferred embodiment of the present invention, in the sub-pixels connected by the same one of the data lines, two of the sub-pixels adjacent to each other have different colors from each other, and two of the sub-pixels being the same in color are spaced apart by two of the sub-pixels having different colors from each other.

In accordance with a preferred embodiment of the present invention, in the sub-pixels connected by the same one of the data lines, red pixel groups, green pixel groups, and blue pixel groups are alternately distributed, two pixel groups being the same in color are spaced apart by two pixel groups having different colors from each other, and each of the pixel groups has the same number of sub-pixels.

In accordance with a preferred embodiment of the present invention, the number of the sub-pixels in each of the pixel groups is N, wherein N is a positive integer greater than 1.

In comparison to the existing COA type liquid crystal display panel, advantages of the present invention are the following: the present invention provides a COA type array substrate, which uniformly distributes the color resists having the different colors on the sub-pixels in the same column and the same row, so that the effects of the color resists on the sub-pixels connected by the same data line are evenly dispersed, which thus further causes the whole display panel to have a uniform display image. Therefore, the technical problem of displaying being affected by the color errors of the display pixels resulting from the leakage current of the thin film transistors of the display pixels caused by the ion diffusion of the color-filter layer in the existing COA type liquid crystal display panel is solved.

DESCRIPTION OF THE DRAWINGS

In order to describe a technical solution in embodiments or existing technology more clearly, drawings required to be used by the embodiments or the existing technology are briefly introduced below. Obviously, the drawings in the description below are only some embodiments of the present invention. With respect to persons of ordinary skill in the art, under a premise that inventive efforts are not made, other drawings may be obtained based on these drawings.

DETAILED DESCRIPTION OF THE PREFERRED EMBODIMENTS

Figure 1:
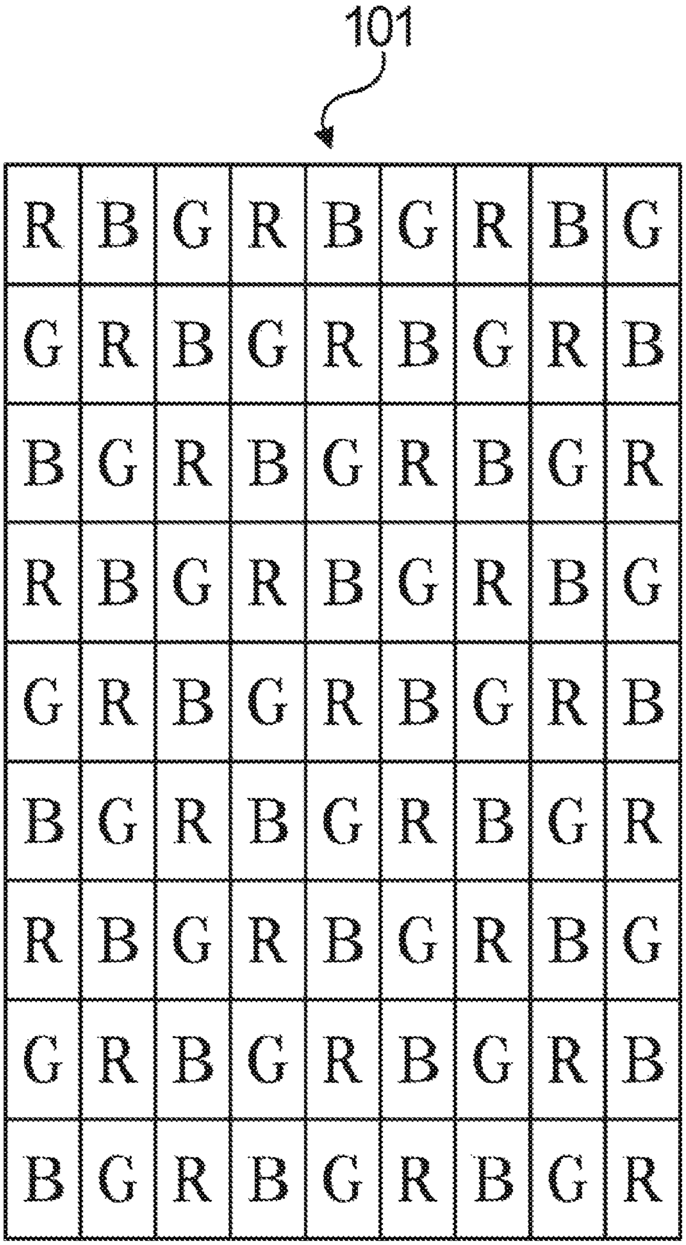
FIG. 1 is an arranged structure of a COA type array substrate of the present invention.

Description of each embodiment below refers to respective accompanying drawing(s), so as to exemplarily illustrate specific embodiments of the present invention that may be practiced. Directional terms mentioned in the present invention, such as “upper”, “lower”, “front”, “back”, “left”, “right”, “inner”, “outer”, “side”, etc., are only directions by referring to the accompanying drawings, and thus the used directional terms are used to describe and understand the present invention, but the present invention is not limited thereto. In the drawings, structurally similar units are labeled by the same reference numerals.

The present invention is directed toward a technical problem of displaying being affected by color errors of display pixels resulting from leakage current of thin film transistors of the display pixels caused by ion diffusion of a color-filter layer in an existing COA type liquid crystal display panel. The present invention can solve the technical problem.

The present invention provides a COA type array substrate, which includes a substrate; thin film transistors arranged in an array on a surface of the substrate, and including gates, sources, and drains; data lines connected to the sources of the thin film transistors, so as to input a display data signal into display pixels; scan lines vertically intersecting with the data lines to define the display pixels, wherein the scan lines are connected to the gates of the thin film transistors, so as to control the gates of the thin film transistors to be turned on or off; and a color resist layer located on the display pixels, and configured to filter a back light transmitted therethrough into a color light. Each of the display pixels includes a red sub-pixel R, a green sub-pixel G, and a blue sub-pixel B. Sub-pixels connected by the same one of the data lines are continuous. That is, the sub-pixels connected by the same one of the data lines are on the same side of the same one of the data lines.

The sub-pixels connected by the same one of the data lines include the red sub-pixels R, the green sub-pixels G, and the blue sub-pixels B, and the red sub-pixels R, the green sub-pixels G, and the blue sub-pixels B are the same in number. The sub-pixels connected by the same one of the scan lines include the red sub-pixels R, the green sub-pixels G, and the blue sub-pixels B, and the red sub-pixels R, the green sub-pixels G, and the blue sub-pixels B are the same in number.

The sub-pixels in the same row and the same column include the same number of red sub-pixels R, green sub-pixels G, and blue sub-pixels B, which therefore results in color resists in different colors to be uniformly distributed on the entire array substrate, and causes effects of the color resists on the thin film transistors on the array substrate to be evenly dispersed, so as to realize uniform display of a COA type display panel.

A structure of the array substrate is not limited to an arrangement of the red sub-pixels R, the green sub-pixels G, and the blue sub-pixels B. For example, sub-pixels in the same row and the same column include the same number of red sub-pixels R, green sub-pixels G, blue sub-pixels B, and white sub-pixels W.

As shown in FIG. 1, in the COA type array substrate provided by the present invention, when the data lines of the array substrate 101 being configured in a vertical way are taken as an example, an arrangement manner of the sub-pixels of the array substrate 101 is the following. In the sub-pixels connected by the same one of the data lines, two of the sub-pixels adjacent to each other have different colors from each other, and two of the sub-pixels being the same in color are spaced apart by two of the sub-pixels having different colors from each other. In other words, each column of the sub-pixels arranged in the vertical way may be arranged in a sequence of the red sub-pixel R, the green sub-pixel G, and the blue sub-pixel B in a cyclic manner.

The scan lines are configured in a horizontal way and are vertically intersecting with the data lines. In the sub-pixels connected by the same one of the scan lines, any two of the sub-pixels adjacent to each other have different colors from each other, and two of the sub-pixels being the same in color are spaced apart by two of the sub-pixels having different colors from each other. That is, each row of the sub-pixels arranged in the horizontal way may be arranged in a sequence of the red sub-pixel R, the green sub-pixel G, and the blue sub-pixel B in a cyclic manner.

In order for the sub-pixels of different colors to be distributed more uniformly, each row of the sub-pixels may be arranged in a sequence of the red sub-pixel R, the blue sub-pixel B, and the green sub-pixel G in the cyclic manner. When each row of the sub-pixels is combined with the sub-pixels arranged in the vertical way, having the red sub-pixels R, the blue sub-pixels B, and the green sub-pixels G simultaneously in any 2×2 pixel unit in the panel can be realized. When the sub-pixels of different colors are closer to each other, an effect of the color resist layer on each sub-pixel of the whole display panel is more evenly dispersed, and therefore a uniform display image may be obtained.

Figure 2:
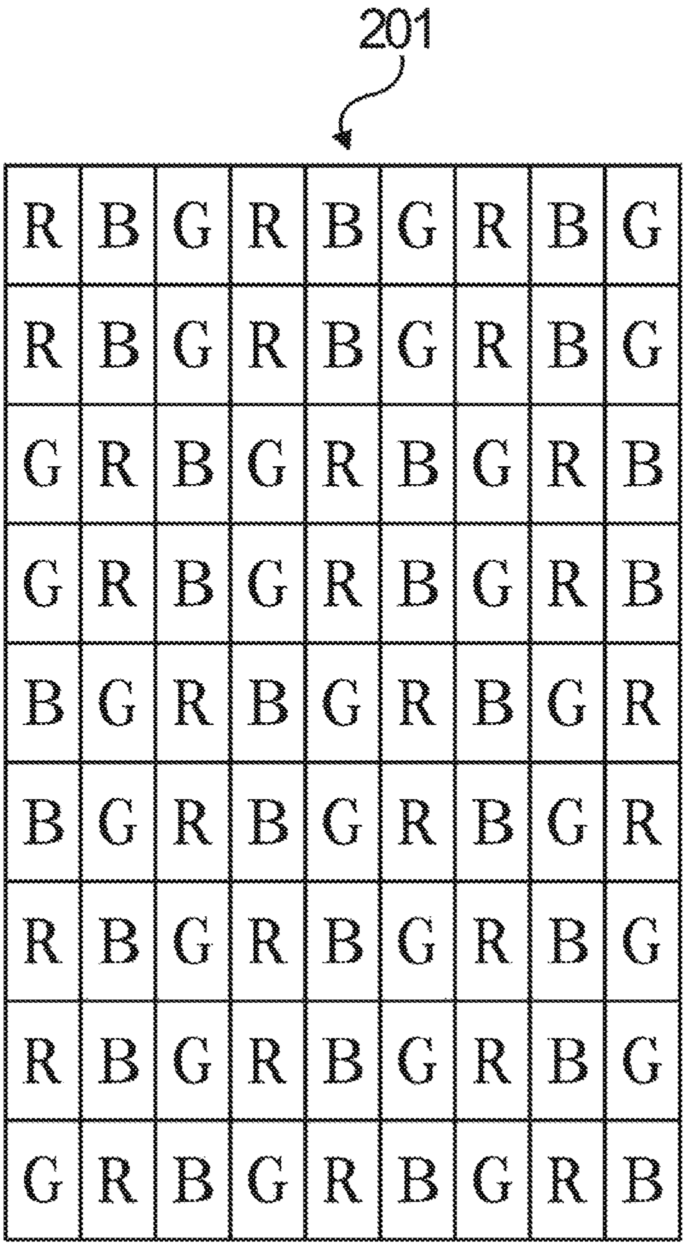
FIG. 2 is another arranged structure of a COA type array substrate of the present invention.

As shown in FIG. 2, in a COA type array substrate of the present invention, taking data lines of the array substrate 201 being configured in a vertical way as an example. In sub-pixels connected by the same one of the data lines, red pixel groups, green pixel groups, and blue pixel groups are alternately distributed, two pixel groups being the same in color are spaced apart by two pixel groups having different colors from each other, and each of the pixel groups has the same number of sub-pixels. Each column of the sub-pixels is arranged in a sequence of the red sub-pixel group, the green sub-pixel group, and the blue sub-pixel group in a cyclic manner.

The red pixel group includes two red sub-pixels R, the green pixel group includes two green sub-pixels G, and the blue pixel group includes two blue sub-pixels B.

By the same token, in order for an effect of a color resist layer on displaying of each sub-pixel in the whole display panel to be evenly dispersed, each row of sub-pixels connected to a respective scan line is arranged in a sequence of the red sub-pixel R, the blue sub-pixel B, and the green sub-pixel G in a cyclic manner. When each row of the sub-pixels is combined with the sub-pixels arranged in the vertical way, having the red sub-pixels R, the blue sub-pixels B, and the green sub-pixels G simultaneously in any 2×6 pixel unit in the panel can be realized, thereby reducing distances between the sub-pixels of different colors.

Figure 3:
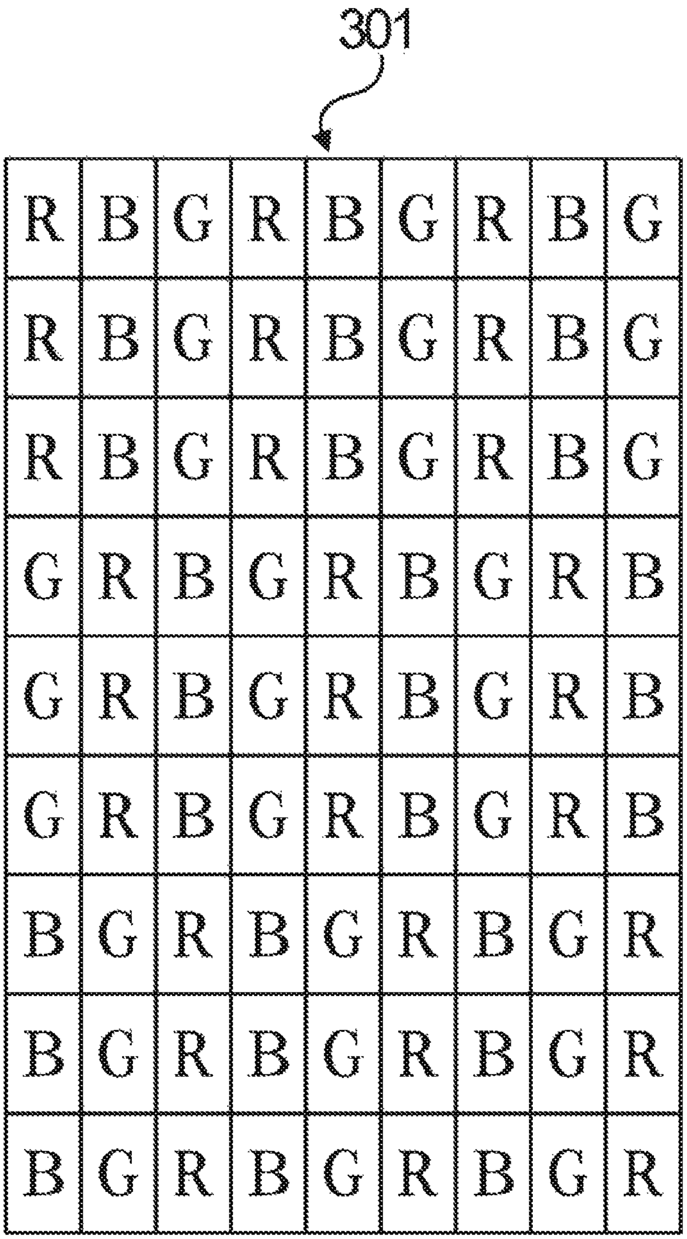
FIG. 3 is still another arranged structure of a COA type array substrate of the present invention.

As shown in FIG. 3, in a COA type array substrate of the present invention, taking data lines of the array substrate 301 being configured in a vertical way as an example. In sub-pixels connected by the same one of the data lines, red pixel groups, green pixel groups, and blue pixel groups are alternately distributed, two pixel groups being the same in color are spaced apart by two pixel groups having different colors from each other, and each of the pixel groups has the same number of sub-pixels. Each column of the sub-pixels is arranged in a sequence of the red sub-pixel group, the green sub-pixel group, and the blue sub-pixel group in a cyclic manner.

The red pixel group includes three red sub-pixels R, the green pixel group includes three green sub-pixels G, and the blue pixel group includes three blue sub-pixels B.

By the same token, in order for an effect of a color resist layer on displaying of each sub-pixel in the whole display panel to be evenly dispersed, each row of sub-pixels connected to a respective scan line is arranged in a sequence of the red sub-pixel R, the blue sub-pixel B, and the green sub-pixel G in a cyclic manner. When each row of the sub-pixels is combined with the sub-pixels arranged in the vertical way, having the red sub-pixels R, the blue sub-pixels B, and the green sub-pixels G simultaneously in any 2×6 pixel unit in the panel can be realized, thereby reducing distances between the sub-pixels of different colors.

According to the aforementioned object of the present invention, a liquid crystal display panel is provided. The liquid crystal display panel includes an upper substrate; a lower substrate; a liquid crystal layer located between the upper substrate and the lower substrate; wherein the lower substrate includes thin film transistors arranged in an array on a surface of the substrate, and including gates, sources, and drains; data lines connected to the sources of the thin film transistors, so as to input a display data signal into display pixels; scan lines vertically intersecting with the data lines to define the display pixels, wherein the scan lines are connected to the gates of the thin film transistors, so as to control the gates of the thin film transistors to be turned on or off; and a color resist layer located on the display pixels, and configured to filter a back light transmitted therethrough into a color light. Each of the display pixels includes a red sub-pixel R, a green sub-pixel G, and a blue sub-pixel B. Sub-pixels connected by the same one of the data lines are continuous. The sub-pixels connected by the same one of the data lines include the red sub-pixels R, the green sub-pixels G, and the blue sub-pixels B, and the red sub-pixels R, the green sub-pixels G, and the blue sub-pixels B are the same in number. The sub-pixels connected by the same one of the scan lines include the red sub-pixels R, the green sub-pixels G and the blue sub-pixels B, and the red sub-pixels R, the green sub-pixels G and the blue sub-pixels B are the same in number.

A principle of operation of the liquid crystal display panel in the present preferred embodiment is the same as a principle of operation of the COA type array substrate of the foregoing preferred embodiment. Details can be referred to in the principle of operation of the foregoing preferred embodiment and the description is omitted here.

In comparison to an existing COA type liquid crystal display panel, advantages of the present invention are the following: the present invention provides a COA type array substrate, which uniformly distributes the color resists having the different colors on the sub-pixels in the same column and the same row, so that the effects of the color resists on the sub-pixels connected by the same data line are evenly dispersed, which thus further causes the whole display panel to have a uniform display image. Therefore, the technical problem of displaying being affected by the color errors of the display pixels resulting from the leakage current of the thin film transistors of the display pixels caused by the ion diffusion of the color-filter layer in the existing COA type liquid crystal display panel is solved.

In summary, although the present invention has been described with preferred embodiments thereof above, it is not intended to be limited by the foregoing preferred embodiments. Persons skilled in the art can carry out many changes and modifications to the described embodiments without departing from the scope and the spirit of the present invention. Therefore, the protection scope of the present invention is in accordance with the scope defined by the claims.

What is claimed is:

1. A color-filter on array (COA) type array substrate, comprising:

a substrate;

thin film transistors arranged in an array on a surface of the substrate, and comprising gates, sources, and drains;

data lines connected to the sources of the thin film transistors, so as to input a display data signal into display pixels;

scan lines vertically intersecting with the data lines to define the display pixels, wherein the scan lines are connected to the gates of the thin film transistors, so as to control the gates of the thin film transistors to be turned on or off; and a color resist layer located on the display pixels, and configured to filter a back light transmitted therethrough into a color light;

wherein each of the display pixels includes a red sub-pixel, a green sub-pixel, and a blue sub-pixel;

wherein corresponding sub-pixels connected by each of the data lines comprise red pixel groups, green pixel groups, and blue pixel groups alternately distributed in color, each two pixel groups being same in color are spaced apart by corresponding two pixel groups having different colors from each other, and each of the pixel groups has a same number of sub-pixels;

wherein a number of the sub-pixels in each of the pixel groups is N, wherein N is a positive integer greater than 1; and wherein corresponding sub-pixels connected by each of the scan lines comprise red sub-pixels, green sub-pixels, and blue sub-pixels alternately distributed in color, and each two sub-pixels of the red sub-pixels, the green sub-pixels and the blue sub-pixels being same in color are spaced apart by corresponding two sub-pixels of the red sub-pixels, the green sub-pixels and the blue sub-pixels having different colors from each other.

2. The COA type array substrate of claim 1, wherein in the corresponding sub-pixels connected by each of the scan lines, the red sub-pixels, the green sub-pixels, and the blue sub-pixels are arranged in a cyclic manner.

3. A liquid crystal display panel, comprising:

an upper substrate;

a lower substrate; and a liquid crystal layer located between the upper substrate and the lower substrate;

wherein the lower substrate comprises:

thin film transistors arranged in an array on a surface of the substrate, and comprising gates, sources, and drains;

data lines connected to the sources of the thin film transistors, so as to input a display data signal into display pixels;

scan lines vertically intersecting with the data lines to define the display pixels, wherein the scan lines are connected to the gates of the thin film transistors, so as to control the gates of the thin film transistors to be turned on or off; and a color resist layer located on the display pixels, and configured to filter a back light transmitted therethrough into a color light;

wherein each of the display pixels includes a red sub-pixel, a green sub-pixel, and a blue sub-pixel;

wherein corresponding sub-pixels connected by each of the data lines comprise red pixel groups, green pixel groups, and blue pixel groups alternately distributed in color, each two pixel groups being same in color are spaced apart by corresponding two pixel groups having different colors from each other, and each of the pixel groups has a same number of sub-pixels;

wherein a number of the sub-pixels in each of the pixel groups is N, wherein N is a positive integer greater than 1; and wherein corresponding sub-pixels connected by each of the scan lines comprise red sub-pixels, green sub-pixels, and blue sub-pixels alternately distributed in color, and each two sub-pixels of the red sub-pixels, the green sub-pixels and the blue sub-pixels being same in color are spaced apart by corresponding two sub-pixels of the red sub-pixels, the green sub-pixels and the blue sub-pixels having different colors from each other.

4. The COA type array substrate of claim 1, wherein the sub-pixels connected by a same one of the data lines are continuous.

5. The COA type array substrate of claim 1, wherein the red pixel groups, the green pixel groups, and the blue pixel groups are same in number.

6. The COA type array substrate of claim 1, wherein the red pixel groups, the green pixel groups, and the blue pixel groups are arranged in a cyclic manner.

7. The COA type array substrate of claim 1, wherein in the corresponding sub-pixels connected by each of the scan lines, the red sub-pixels, the green sub-pixels, and the blue sub-pixels are same in number.

8. The liquid crystal display panel of claim 3, wherein the sub-pixels connected by a same one of the data lines are continuous.

9. The liquid crystal display panel of claim 3, wherein the red pixel groups, the green pixel groups, and the blue pixel groups are same in number.

10. The liquid crystal display panel of claim 3, wherein the red pixel groups, the green pixel groups, and the blue pixel groups are arranged in a cyclic manner.

11. The liquid crystal display panel of claim 3, wherein in the corresponding sub-pixels connected by each of the scan lines, the red sub-pixels, the green sub-pixels, and the blue sub-pixels are same in number.

12. The liquid crystal display panel of claim 3, wherein in the corresponding sub-pixels connected by each of the scan lines, the red sub-pixels, the green sub-pixels, and the blue sub-pixels are arranged in a cyclic manner.

* * * * *

UNITED STATES PATENT AND TRADEMARK OFFICE

CERTIFICATE OF CORRECTION

PATENT NO. : 10,684,519 B2
APPLICATION NO. : 15/580792
DATED : June 16, 2020
INVENTOR(S) : Qiming Gan and Meng Wang It is certified that error appears in the above-identified patent and that said Letters Patent is hereby corrected as shown below:

On the Title Page

At "(73) Assignee", delete "SHENZHEN CHINA STAR OPTOELECTRONICS TECHNOLOGY CO., LTD." and insert --SHENZHEN CHINA STAR OPTOELECTRONICS SEMICONDUCTOR DISPLAY TECHNOLOGY CO., LTD.--

Signed and Sealed this
Twenty-fifth Day of June, 2024

Katherine Kelly Vidal

Katherine Kelly Vidal
*Director of the United States Patent and Trademark Office*